(12) United States Patent
Simon (10) Patent No.: US 6,243,922 B1
(45) Date of Patent: Jun. 12, 2001

(54) DETACHABLE CLASPING FASTENER

(75) Inventor: Eric M. Simon, Salt Lake City, UT (US)

(73) Assignee: Dexterity, Inc., Salt Lake City, UT (US)

( * ) Notice: Subject to any disclaimer, the term of this patent is extended or adjusted under 35 U.S.C. 154(b) by 0 days.

(21) Appl. No.: 09/518,599

(22) Filed: Mar. 3, 2000

(51) Int. Cl.⁷ .......................... A44B 13/00; A44B 15/60
(52) U.S. Cl. ............................. 24/3.6; 24/598.6
(58) Field of Search .................. 24/30.5 R, 30.5 P, 24/3.6, 16 PB, 598.4, 598.5, 598.6, 343, 346, 588, 546, 3.12, 3.11, 3.13; 292/82.18; 206/38.1; 70/457, 458, 486 R (56) References Cited

U.S. PATENT DOCUMENTS

| | | |
|---|---|---|
| 1,333,655 | 3/1920 | Davis . |
| 1,388,100 | 9/1921 | Davis . |
| 1,419,408 | 6/1922 | Polhemus . |
| 1,751,458 * | 3/1930 | Valkenburg .................. 24/598.5 |
| 2,209,475 | 7/1940 | Rawlings ........................ 24/237 |
| 2,342,078 | 2/1944 | Jones ............................. 70/156 |
| 2,840,898 * | 7/1958 | Yeo ................................. 24/598.6 |
| 3,545,049 * | 12/1970 | Brueggeman ................. 24/598.5 |
| 3,599,298 * | 8/1971 | Anderson ....................... 24/598.5 |
| 3,604,066 * | 9/1971 | Moon ............................. 24/30.5 R |
| 3,657,909 * | 4/1972 | Bozwell ......................... 70/457 |
| 3,882,573 | 5/1975 | Thomas, Jr. ................... 24/30.5 T |
| 4,191,038 | 3/1980 | Vaughn .......................... 70/457 |
| 5,813,262 | 9/1998 | Crumley ........................ 70/457 |

* cited by examiner

Primary Examiner—Robert J. Sandy (57) ABSTRACT

A reversibly attachable fastener has a generally figure-8 geometry when in the engaged state. The fastener is composed of two generally symmetric halves, each comprising arm portions, shoulder portions, and head portions, and the halves are connected by a spring loop. One half of the fastener contains a window feature that allows the opposing, singular half to extend through and be supported in a nested fashion. The half containing the window feature has crown protrusions on the head portions which are then spanned by a bridge structure. The opposing, singular half is provided with a crown protrusion which is notched, this crown protrusion catching on the bridge structure to maintain the fastener in the engaged state. The fastener can be used to easily and reversibly attach various objects, such as keys to keyrings or identification tags to luggage.

22 Claims, 5 Drawing Sheets

DETACHABLE CLASPING FASTENER

BACKGROUND

1. Field of Invention

This invention relates to fasteners, specifically to a removable clasping fastener for reversibly linking two objects.

2. Description of Prior Art

Various fasteners have been developed which serve to reversibly attach items such as keys to a holder or central containment device, such as a key ring. Often the ring itself will allow removal of the item, such as in the case of a split-ring. In other configurations, an intermediary fastener is used to attach the item to the holder. The following is a discussion of these fasteners and their drawbacks:

All of the aforementioned fasteners are substantially produced by bending metal wire. This fabrication technology is relatively slow and expensive since each piece must be produced individually and features, such as depressions, cuts, and detents, must be done in separate steps. Because metal cannot be internally colored, colored devices in these geometries must be produced in a separate coating or anodizing step; this coating can chip or wear with time, leaving the device less than aesthetically pleasing and open to corrosive attack. Depending upon the type of metal used and the cross-sectional size of the wire, it may be possible to over-strain the fastener during use, resulting in permanent deformation. One device, depicted by RAWLINGS in U.S. Pat. No. 2,209,475 (1940), is unsuitable for directly attaching the object to the containment device and therefore must use an intermediary device, such as a chain and split-ring. Because the opening loop of all of these devices is essentially two-sided, all of these designs may unexpectedly open upon the application of the torsional or twisting force commonly seen during normal usage.

U.S. Pat. No. 2,342,078 to JONES (1944) avoids some of the problems encountered with metal wire by using a die-blanked and bent sheet metal geometry. Furthermore, this design teaches the use of three interdigitating arms in the opening loop to resist torsional forces. Although not made using wire, this device nevertheless requires at least two steps for production. Likewise, the use of metal is problematic for other reasons, such as the need for coating, potential for corrosion and deformation, and high tooling costs, as delineated above. The interdigitating 3-arm geometry provides improved torsional resistance; however, the two arms on one side of the loop are not connected except at the base and therefore might be prone to separation or permanent deformation under high loads. Finally, the non-opening loop of this fastener is substantially flat and narrow and therefore the potential arises during compression for this loop to pinch the key or other object to be attached, particularly when this fastener is small in size relative to the object.

OBJECTS AND ADVANTAGES

Accordingly, several objects and advantages of my invention are as follows: To provide an improved fastener, firstly, with the ability to be produced quickly and in large quantity from a variety of materials including thermoplastic or thermoset resins, sintered metal particles, or cast metals. Fillers can be used to enhance color, wear, lubricity, stiffness, flexibility, and other properties. Moreover, it is also be possible to use two compatible over-molded materials to enhance performance and/or appearance. Also, the use of high-volume production technology, such as injection molding, allows use of various ancillary features, such as stops, snaps, channels, detents and ridges, and allows application of molded-in images including alpha-numeric characters. Secondly, the fastener has good stiffness, support, and resistance to twisting forces. Thirdly, the possibility of overstressing is reduced during opening and assists in preventing pinching of the attached object.

Still further objects and advantages will become apparent from a consideration of the ensuing description and accompanying drawings.

| Reference Numerals | |
|---|---|
| 100 | spring loop |
| 100' | thin spring loop |
| 100" | thick spring loop |
| 100'" | narrow spring loop |
| 100"" | wide spring loop |
| 101 | inner radial surface |
| 102 | outer radial surface |
| 110 | left arm portion |
| 111 | right arm portion |
| 112 | front step |
| 113 | shelf |
| 114 | left outside face |
| 115 | right outside face |
| 116 | rear step |
| 117 | front upper step |
| 119 | rear upper step |
| 120 | left shoulder portion |
| 121 | right front shoulder portion |
| 123 | right rear shoulder portion |
| 125 | window |
| 130 | left head portion |
| 131 | right front head portion |
| 133 | right rear head portion |
| 140 | jaw feature |
| 141 | right front jaw portion |
| 143 | right rear jaw portion |
| 150 | crown protrusion |
| 151 | right front crown protrusion |
| 152 | notch |
| 153 | right rear crown protrusion |
| 154 | horizontal face of notch |
| 155 | bridge portion |
| 156 | vertical face of notch |
| 157 | horizontal face of bridge |
| 159 | vertical face of bridge |
| 160 | left attachment gap |
| 161 | right attachment gap |
| 170 | interhead gap |
| 200 | attachment gap |
| 301 | key |
| 302 | keyring |
| 401 | protuberance |
| 403 | protuberance face |
| 410 | corner portion |
| 501 | barb protrusion |
| 502 | undercut |
| 610 | wedge |
| 611 | v-notch |
| 612 | catch face of wedge |
| 613 | catch face of v-notch |
| 614 | lateral face of corner |
| 700 | fastening loop |
| 800 | headed stud |
| 810 | ring |
| 812 | eyelet of ring |
| 901 | front face of spring loop |
| 902 | back face of spring loop |

SUMMARY

A detachable clasp-style of fastener comprises a pair of opposite facing hooks, which function to enclose and engage a wire or loop-like secondary object. The hooks are connected to a semi-circular flexion loop by radial arms and shoulder sections. The hook of single construction has a catch protruding from its top surface. The hook of dual construction has a bridge spanning its top surfaces, such that when the hooks are brought into proximal contact by the application of pressure to the radial arms, the catch will be forced beneath and will engage upon the bridge, thereby preventing the hooks from separating and returning to their original state. Application of additional pressure to the radial arms will result in the hooks moving apart to form a gap which will allow attachment to or disengagement from the secondary object. Additional securing may be added to the fastener by the addition of male or female features on the front and back surfaces of the shoulder sections. These features supply resistance to opening the hooks and therefore reduce the potential for untimely detachment of the fastener.

PREFERRED EMBODIMENT

Description

FIGS. 1A—1D

Figure 1A:
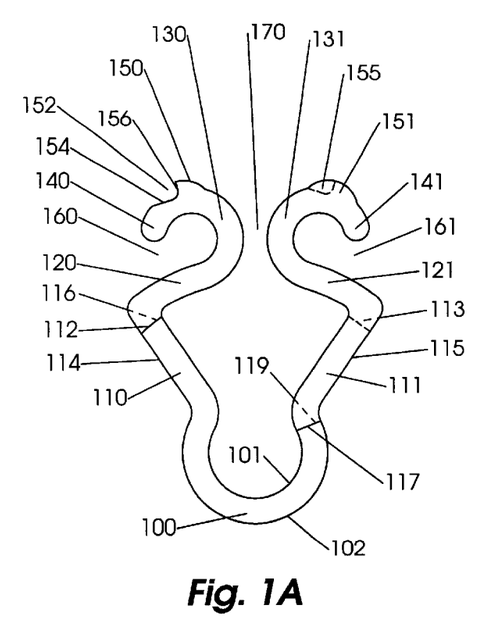
FIG. 1A is a front view of a detachable clasping fastener in the as-molded state, according to my invention.
Figure 1B:
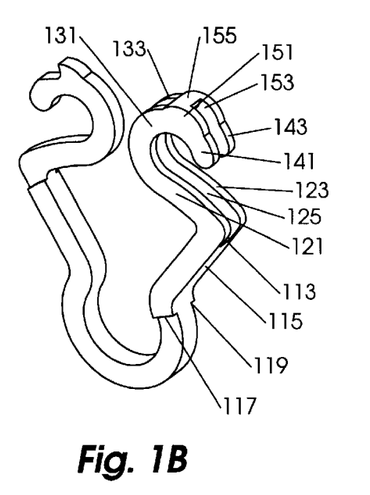
FIG. 1B is a front perspective view of the fastener of FIG. 1A
Figure 1C:
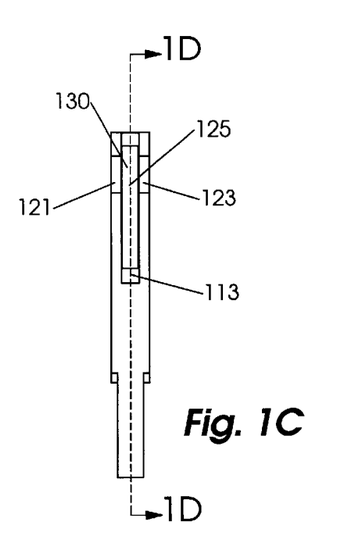
FIG. 1C is a right side view of the fastener of FIG. 1A

FIGS. 1A and 1B show a preferred embodiment of the detachable clasping fastener in the as-molded state. The fastener is composed of two generally symmetric halves. The left or singular-construction half contains left arm portion 110, left shoulder portion 120, and left head portion 130. The right or dual-construction half contains analogous features, differing in that the upper structures have both frontal and distal elements. These include right arm portion 111, right front shoulder portion 121, right rear shoulder portion 123, right front head portion 131, and right rear head portion 133. The lower aspects of left and right arm portions 110 and 111 are connected by a generally circular spring loop 100 having an inner radial surface 101 and an outer radial surface 102. Loop 100 functions as a torsional spring element when the fastener is in the engaged and compressed states.

The left half of the fastener is composed of a continuous band of material. Where left arm portion 110 attaches to left shoulder portion 120, a front step 112 and a rear step 116 are provided on each side of the fastener, resulting in the shoulder portion being thinner than the arm portion. Shoulder portion 120 is of an arced geometry, having its radial center generally at the radial center of loop 100. The shoulder portion transitions into head portion 130, which arcs in a direction opposite to that of the shoulder portion and at a substantially smaller radius. Situated at the top of head portion 130 is a crown protrusion 150 having generally semicircular geometry. The lateral aspect of crown 150 is absent, resulting in notch 152 having a generally vertical face 156 and a horizontal face 154. Head portion 130 terminates in jaw 140, which in turn produces left attachment gap 160 between itself and shoulder 120. The cross-sectional thicknesses of portions 120,130,140, and 150 are substantially the same.

In contrast to the left half of the fastener, the right half is of dual construction. Arm portion 111 is solid until it transitions into front and rear shoulder portions 121 and 123. FIG. 1B is a perspective view of the fastener showing window 125 molded into shoulder portions 121 and 123. Shelf 113 forms the bottom aspect of window 125.

Figure 1D:
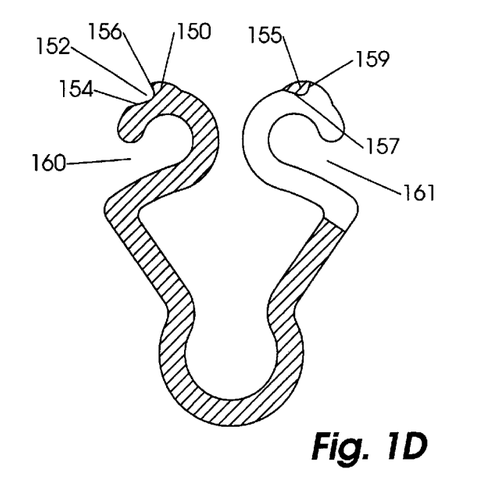
FIG. 1D is a front sectional view of the fastener taken along the line 1D—1D (midline) of FIG. 1C.

Referring to the planar cross-sectional view of FIG. 1D, right shoulder portions 121 and 123 are of arced geometry similar to left shoulder portion 120, having radial centers generally at the radial center of loop 100. The right shoulder portions transition into head portions 131 and 133, which terminate in right front and rear jaw portions 141 and 143, respectively. Situated at the top of right head portions 131 and 133 are right front and rear crown protrusions 151 and 153, respectively. Being analogous to protrusion 150, front and rear crown protrusions 151 and 153 are of generally semicircular geometry. Spanning protrusions 151 and 153 is a bridge portion 155.

Bridge portion 155 has a generally vertical face 159 and a generally horizontal face 157. Similar to the left half, a right attachment gap 161 exists between jaw portions 141 and 143 and shoulder portions 121 and 123. An interhead gap 170 exists between the right and left head portions, the size of this gap being determined by molding concerns and the amount of flexural stress desired within the loop 100 when the fastener is in the engaged and compressed states.

The detachable clasping fastener is designed for production by injection molding. Although this generally implies the use of a thermoplastic resin, a thermosetting resin can also be used. Standard thermoplastic injection molding is preferred due to cost considerations; however, other types of injection molding, such as resin transfer molding or reaction injection molding, can also be employed. Other plastic forming techniques, such as resin casting, can be used, but economics are less favorable.

If the preferred molding technology of thermoplastic injection molding is employed, various classes of resins can be used as long as the mechanical characteristics of the specific material are suitable. For example, torsion spring loop 100 undergoes a high degree of flexion during usage and thus the material should have good flexural strength. Likewise, since the fastener may undergo twisting, tensile, and compressive forces during normal usage, the molded material must be stiff enough to resist the resultant deformations. Other material considerations include impact resistance, UV resistance (for outdoor usage), fatigue strength, and resistance to creep. It has been found that polyamides and polyacetals are suitable in this application. Conversely, it is possible to use a less robust resin, such as polypropylene, particularly if it has been enhanced by the addition of structural filler such as glass fibers or beads, or mineral particles.

If a particularly strong fastener is required, the detachable clasping fastener can be readily fabricated in metal using casting technologies or, more preferably, metal injection molding (MIM). MIM, a technique of powder metallurgy, utilizes a slurry of metal particles which is injected under pressure into a cavity, similar to plastic injection molding. The compacted metal part is then removed from the mold cavity and subsequently placed into an oven where the metal particles are sintered into a micro-porous mass. The specific means by which the detachable clasping fastener can be produced by MIM will be obvious to one familiar with the art. Metallic materials suitable for production of the detachable clasping fastener via MIM include brass, zinc alloys, nickel alloys, aluminum alloys, and various types of steel.

The detachable clasping fastener can be made in a wide range of sizes to meet the needs of the intended application. The smallest size obtainable will likely be dictated by the means of production and can be on the order of 0.25 inches tall. The fastener has no upper size limitations, however practical considerations might limit the maximum size to roughly 12 inches tall. Size and cross-sectional area will also be dictated by the desired mechanical characteristics of the fastener and will thus be contingent upon the type of material used for fabrication.

PREFERRED EMBODIMENT

Operation

FIGS. 1A–1D

Operation of the detachable clasping fastener is simple and straightforward. In the case of a key or similar object with an isolated fastening hole or slot, the object is first threaded over left head portion 130 and left shoulder portion 120 of the fastener, down left arm portion 110, and stops at the bottom of loop 100. Alternatively, the object can be threaded over the other side of the fastener; that is, over right head portions 131 and 133, right shoulder portions 121 and 123, right arm portion 111, and stopping at the bottom of loop 100. Depending upon the thickness of the fastener and the size of the fastening hole in the object, the object to be fastened can be threaded over either half of the detachable clasping fastener. However, if the fastener is too thick or if the fastening hole of object is too small, it may only be possible to thread the object over the singular head and shoulder half of the fastener; the half with window 125 may be too large.

Once the object to be fastened is in position on loop 100, the detachable clasping fastener is engaged. This occurs via manual pressure on the outside faces 114 and 115 of arm portions 110 and 111, respectively. Interhead gap 170 between the head portions is reduced until left-side head portion 130 enters window 125 positioned between right-side head portions 131 and 133. Subsequently, left-side crown protrusion 150 contacts right-side bridge portion 155 and, through continued manual pressure, is forced beneath bridge portion 155 until generally vertical face 156 crosses generally vertical face 159. At this point, left-side crown protrusion 150 snaps upward resulting in the engaged position in which notch 152 is engaged with bridge 155.

Figure 2A:
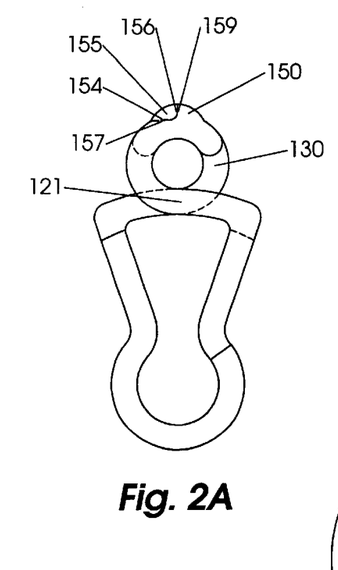
FIG. 2A is a front view of the fastener in the engaged state.
Figure 2B:
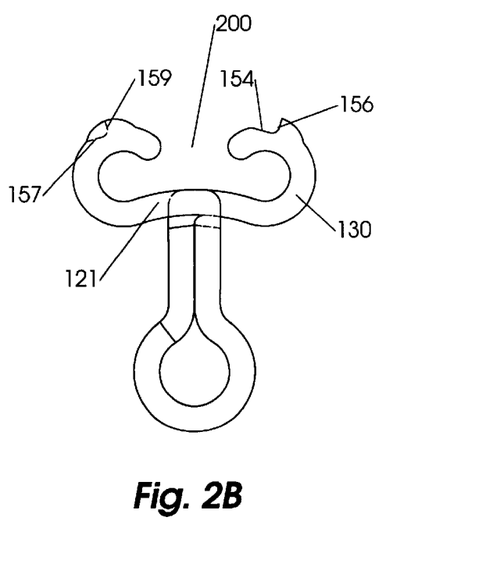
FIG. 2B is a front view of the fastener in the compressed state as positioned for attachment or detachment.

FIGS. 2A and 2B

The engaged position of the detachable clasping fastener is shown in FIG. 2A. In the engaged position, generally vertical faces 156 and 159 are in opposition to each other, preventing the head portions from moving back into the as-molded configuration. Generally horizontal faces 154 and 157 are in close opposition but do not contact. Loop 100 is under flexural stress, resulting in continual oppositional force between generally vertical faces 156 and 159.

Although the fastener is in the engaged position with the object to be fastened attached, it has now to be affixed to the secondary object. In the case of a key, the secondary object can be a keyring or, alternatively, a peg on a board. To be affixed to the secondary object, the fastener is put into the compressed state. As before, manual pressure is applied to outside faces 114 and 115 and head portion 130 again moves through window 125 between head portions 131 and 133. Eventually, the head portions cease to overlap and an attachment gap 200 is formed between jaw portion 140 of one half and jaw portions 141 and 143 of the other half. The fastener is designed to allow attachment gap 200 to open to a degree wide enough to accommodate most standard keyrings and other objects of similar cross-sectional diameter. As depicted in FIG. 2B, the fastener is now in the compressed state and the secondary object to be fastened is easily inserted through attachment gap 200. Manual pressure is thereupon reduced and attachment gap 200 closes until the fastener relaxes, returning to the engaged state.

Figure 3:
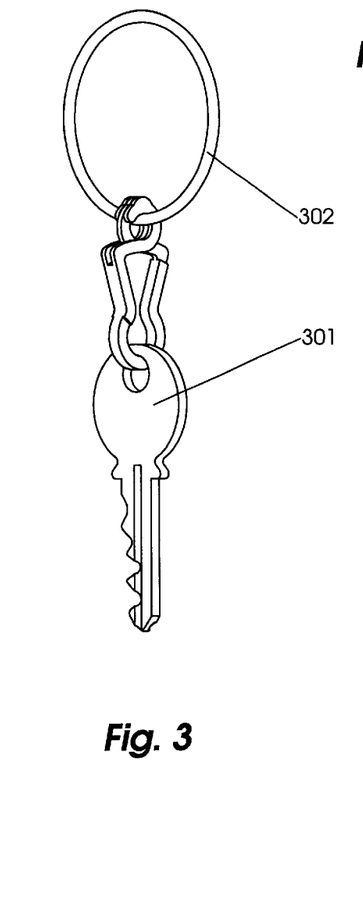
FIG. 3 is a perspective view of the fastener shown engaging a key to a ring.

FIG. 3

FIG. 3 shows an obvious use of the fastener in which it is depicted attaching a key 301 to a keyring 302. In similar fashion, a plurality of keys can be attached to a keyring using the detachable clasping fastener, each key utilizing its own fastener. In practice, a fastener the size shown in FIG. 3 can accommodate two or more keys but crowding may result if too many are placed on a fastener, interfering with the process of attachment and detachment to the secondary object.

Of course, other objects can be detachably fastened using the fastener. For example, one can use the fastener to attach an identification tag to a suitcase or briefcase. Alternately, the fastener can be employed to attach a loop of cordage or webbing to another structure, as is commonly required for tents and the like. Other applications are obvious and the geometry and force requirements of the application can be accommodated by utilizing different sizes and geometric variations of the fastener.

Although fasteners having a general "FIG. 8" geometry are well known, particularly as applied toward key fastening, the geometry of the detachable clasping faster is physically different and provides specific advantages. First, the device is produced in an open configuration which allows modern molding technology to be employed for production. Second, the use of dual-construction on one half of the fastener allows the opposite singular-construction half to be nested, resulting in the fastener being securely held while in the engaged state. This is of great importance as twisting forces are likely to be encountered during normal usage, which can prematurely open the head portions of analogous fasteners having two halves of singular construction, as is the case with a number of the cited references. Finally, and most uniquely, bridge portion 155 of the fastener retains head portions 141 and 143 in fixed approximation. Thus, the bridge structure serves a dual purpose of both acting as a latching feature to maintain the faster in the engaged state and also to provide stabilization of the head portions against twisting forces.

ALTERNATIVE EMBODIMENTS

Description and Operation

Figure 4A:
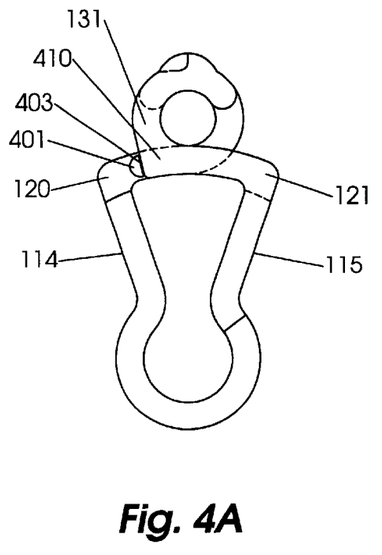
FIG. 4A is a front view of an alternative embodiment of the fastener having hemispherical catch nubbins and associated catch faces for releasably securing a head portion from premature opening.
Figure 4B:
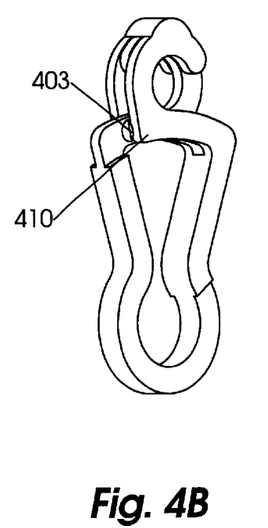
FIG. 4B is a perspective view of an alternative embodiment of the fastener of FIG. 4A.

FIGS. 4A and 4B

FIGS. 4A–B, 5A–B, and 6A–B show various alternative embodiments of the detachable clasping fastener which provide security features to prevent premature opening.

FIGS. 4A and 4B show front elevational and perspective views of a detachable clasping fastener having modified head and shoulder portions. On the dual-construction half of the fastener, where shoulder portion 121 meets head portion 131, a corner portion 410 has been added. Corner portion 410 assumes a generally 90-degree geometry and is continuous with shoulder 121 and head 131. On the singular-construction half of the fastener, on shoulder portion 120, a protuberance 401 has been added. Protuberance 401 is positioned such that it will be in proximity to a lateral face of corner portion 410 when the fastener is in the engaged state. Protuberance 401 is generally semi-hemispherical in shape and has a face 403 which is in opposition to lateral face of corner portion 410. Protuberance 401 and corner portion 410 are also present on the back side of the fastener in similar positions. Depending upon the stiffness of the material used in fabrication and upon the desired opposing force, may be perpendicular to the surface of shoulder portion 120 or may emanate at some angle less than 90 degrees.

Furthermore, protuberance 401 can have alternative geometries, such as a full hemispherical form, conical form, or frusto-conical form. In general, protuberance 401 will have a form necessary to balance opposing force with lateral face with the inherent mechanical characteristics of the material employed.

Operation of the fastener in FIGS. 4A and 4B is simple and straightforward. As manual pressure is applied to outside faces 114 and 115 in order to open the jaws of the fastener (as in the case of attaching or detaching), shoulder portions 120 and 121 slide in radial fashion to each other. Almost immediately, lateral face of corner portion 410 comes into contact with protuberance 401, thereby applying opposing force. If the applied manual pressure is great enough to overcome the opposing force, shoulder portion 121 is deflected slightly outward and corner portion 410 moves out and over protuberance 401. The same occurs on the symmetric features on the back of the fastener. Continued application of manual force results in the jaw portions opening. Thus, the catch features act to oppose opening of the jaws until sufficiently large pressure is applied—this pressure is generally too large to be applied inadvertently, as might result in the case of a key fastened to a keyring which undergoes various twisting, compressive, and tensile forces in the pocket of a user. In this way, the fastener is prevented from premature opening and subsequent undesired detachment.

Figure 5A:
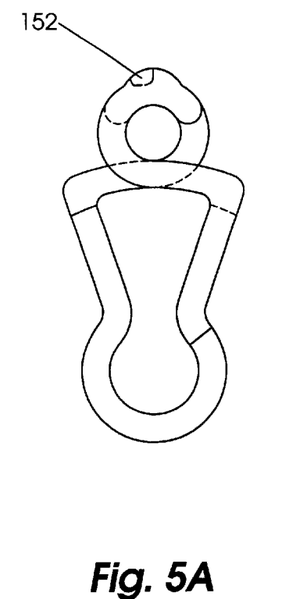
FIG. 5A is a front view of another alternative embodiment of the fastener having snap hook features on the top of the head for releasably securing the head portion from premature opening.
Figure 5B:
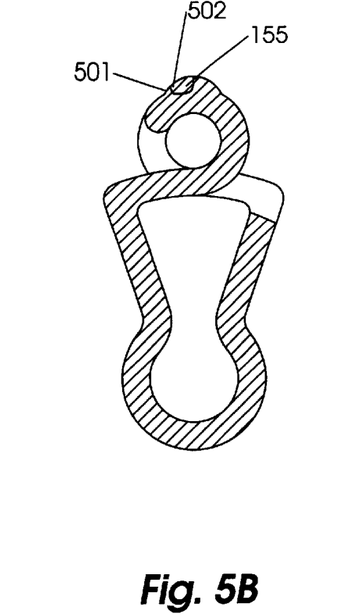
FIG. 5B is a midline front sectional view of the alternative embodiment of the fastener of FIG. 5A.

FIGS. 5A and 5B

FIGS. 5A and 5B show front elevational and perspective views of a detachable clasping fastener having modified crown protrusions. In this embodiment, the bridge and notch features of the crown protrusions are modified such that a small barb protrusion 501 is positioned on the outside of notch 152 and an associated undercut 502 is placed in bridge 155. As manual pressure is applied to the fastener to induce opening of the jaws, barb 501 catches on undercut 502 resulting in the need for additional pressure to achieve opening. Eventually, if sufficient pressure is applied, barb 501 is forced beneath bridge 155 and opening of the jaws occurs. Though simple in operation, the embodiment of FIGS. 5A and 5B is not the fastener presently preferred to that in FIGS. 4A and 4B for two reasons: First, the catch features of FIGS. 4A and 4B occur on both the front and back of the fastener, thereby providing greater opposing force to premature opening. Second, the undercut 502 of the fastener embodied in FIGS. 5A and 5B is more complex to fabricate via injection molding and would likely add cost to the mold and the fastener.

Figure 6A:
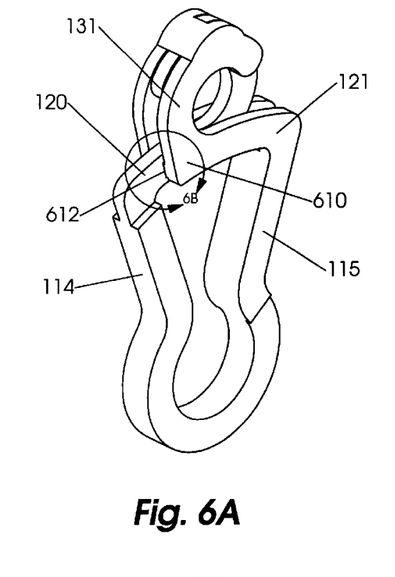
FIG. 6A is a perspective view of another alternative embodiment of the fastener having snap barbs and associated grooves for releasably securing the head portion from premature opening.
Figure 6B:
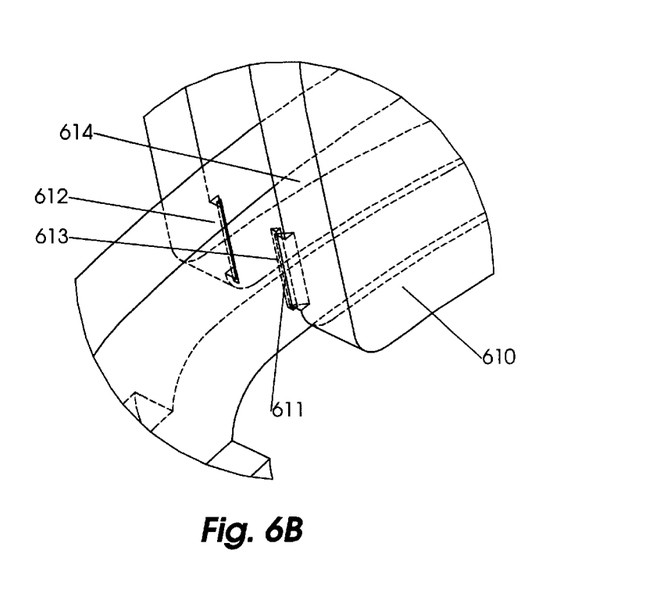
FIG. 6B is an enlarged perspective view of detail 6B of FIG. 6A.

FIGS. 6A and 6B

FIGS. 6A and 6B are perspective and detail views of a detachable clasping fastener having modified head and shoulder portions which provide security features analogous to those of the fastener in FIGS. 4A and 4B. On the dual-construction half of the fastener, where shoulder portion 121 meets head portion 131, a corner portion 410 has been added. Corner portion 410 assumes a generally 90-degree geometry and is continuous with shoulder 121 and head 131. Extending toward the midplane of the fastener from corner portion 410 is a barb or wedge-like structure 610 which protrudes a small distance into the nominal surface of shoulder portion 120 of the singular-construction half. Positioned on shoulder portion 120 is an invaginated slot or v-notch 611. V-notch 611 is designed such that it will be slightly larger than and will receive wedge 610. Wedge 610 is depicted as being generally triangular in cross-section and has a catch face 612 which is in opposition to catch face 613 of V-notch 611. Catch face 612 of wedge 610 is generally continuous with the lateral face 616 of corner 410. Wedge 610 and V-notch 611 are also present on the back side of the fastener in symmetrical positions. Depending upon the stiffness of the material used in fabrication and upon the desired opposing force, catch face 613 of V-notch 611 may be parallel to the opposing catch face 612 of the wedge or may be positioned at an angle to allow less resistive force. Furthermore, wedge 610 and V-notch 611 might have alternative geometries such as semi-hemispherical forms, full hemispherical forms, conical forms, or frusto-conical forms.

Operation of the fastener of FIGS. 6A and 6B is simple and straightforward. As manual pressure is applied to outside faces 114 and 115 in order to open the jaws of the fastener (as in the case of attaching or detaching), shoulder portions 120 and 121 attempt to slide in radial fashion to each other. Immediately, catch face 612 of wedge 610 comes into contact with catch face 613 of V-notch 611 thereby inducing an opposing force. If the applied manual pressure is great enough to overcome the opposing force, shoulder portion 121 is deflected slightly outward and corner portion

410 moves out and over V-notch 611; similarly, the same occurs on the symmetric features on the back of the fastener. Continued application of manual force results in the jaw portions opening. Thus, the catch features act to oppose opening of the jaws until sufficiently large pressure is applied. As with the previous alternative embodiments, the fastener is prevented from premature opening and subsequent undesired detachment.

ALTERNATIVE EMBODIMENT

Description and Operation

Figure 7:
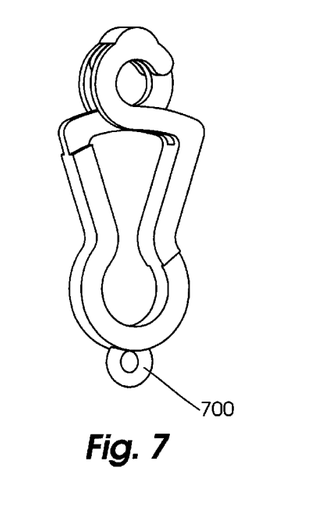
FIG. 7 is a perspective view of an alternative embodiment having an integral attachment loop.

FIG. 7

FIG. 7 is a perspective view of an alternative embodiment of the fastener. This embodiment has an integral fastening loop 700 which is positioned beneath loop 100 to provide an alternative means of attachment to the object to be fastened. Fastening loop 700 has a toroidal geometry with a circular cross-section; however, depending upon the application and means of production, it may be useful to employ another geometry such as rectangular, triangular, ellipsoidal or semi-circular. Likewise, an alternative cross-sectional shape such as rectangular or oval may at times be desirable. Other geometries and cross-sectional shapes might also be desirable.

The use of fastening loop 700 is indicated under certain conditions. It may be that the attachment hole or through-feature of the object to be fastened is too small or of the wrong geometry to allow it to be threaded over the head, shoulder, or arm portions of the fastener. Alternately, the object to be fastened might be too thick to allow the detachable clasping fastener to function freely when positioned over loop 100. In these cases an intermediate linking device such as a split-ring or simple wire loop could be employed to attach the object to the fastener via fastening loop 700. Another situation warranting the use of fastening loop 700 occurs when the object to be fastened must be attached to the fastener in a permanent manner. A wire loop can be used to attach the object to the fastener through fastening loop 700, and since fastening loop 700 is continuous, the wire loop would have to be plastically deformed to remove the attached object. Obviously, other intermediate attachment devices could be employed to permanently, semi-permanently, or removably fix the attached object to fastening loop 700.

ALTERNATIVE EMBODIMENT

Description and Operation

Figure 8:
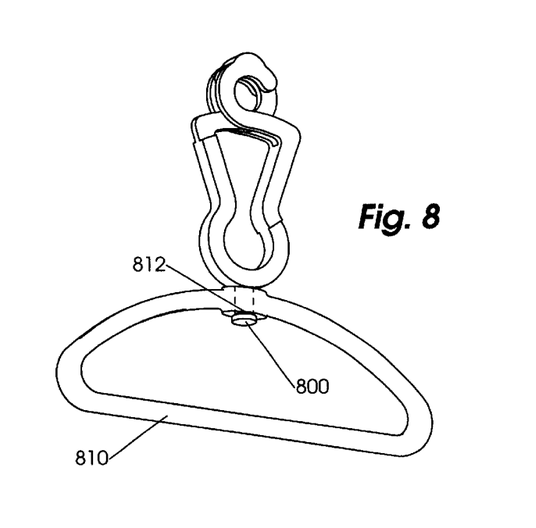
FIG. 8 is a perspective view of an alternative embodiment having an integral headed stud incorporated into a ring such that the fastener is allowed to swivel.

FIG. 8

FIG. 8 is a perspective view of an alternative embodiment of the detachable clasping fastener incorporated into a ring 810 through the use of an integral headed stud 800. The headed stud is positioned through an eyelet 812 on the ring and is allowed to swivel. The ring 810 is positioned beneath loop 100 to provide an alternative means of attachment to another object, such as cordage or webbing. Ring 810 is depicted as being of D-shape geometry with circular cross-section; however, depending upon the application and means of production, it may be useful to employ another outline geometry such as rectangular, circular, ellipsoidal or oval. Likewise, other cross-sectional shapes such as rectangular, square, or oval may at times be desirable The use of a ring 810 is indicated under certain conditions. Similar to the embodiment of FIG. 7., it may be that the attachment hole or through-feature of the object to be fastened is too small or of the wrong geometry to allow it to be threaded over the head, shoulder, or arm portions of the fastener. It may at times be desirable to position the fastener on a piece of webbing; use of a ring 810 facilitates this application. If the ability of the fastener to swivel on ring 810 is undesirable, the diameter of headed stud 800 could be sufficiently large as to result in immovable or semi-immovable interference in eyelet 812. Alternately, ring 810 might be integrally molded or secondarily bonded onto the outer surface 102 of loop 100.

ALTERNATIVE EMBODIMENTS

Description and Operation

FIGS. 9A–9D

Figure 9A:
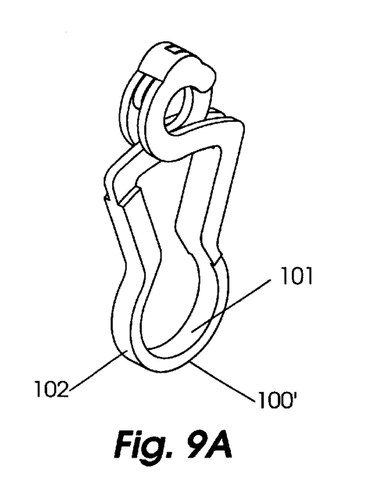
FIG. 9A is a perspective view of another embodiment of the fastener having a thinner spring element.

FIGS. 9A–9D are alternative embodiments showing perspective views of detachable clasping fasteners having different spring geometries. FIG. 9A shows a fastener having a thinner spring element. In comparison to the preferred embodiment, inner radial surface 101 has been positioned closer to outer radial surface 102 of loop 100'. In this way, the cross-sectional area of loop 100' has been reduced in comparison to that of loop 100, thereby producing less spring force in the engaged- and compressed-states. Such geometry may be desirable in the event a very stiff material or a material with limited flexural strength is used to mold the fastener.

Figure 9B:
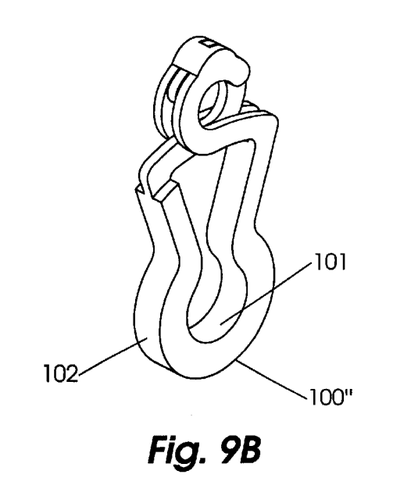
FIG. 9B is a perspective view of another alternative embodiment of the fastener having a thicker spring element.

FIG. 9B shows a fastener having a thicker spring element. In comparison to the preferred embodiment, outer radial surface 102 has been positioned further away from inner radial surface 101 of loop 100". Converse to the fastener of FIG. 9A, this embodiment offers greater spring force than the preferred embodiment which may be desirable in the event a soft material is used to mold the fastener.

Figure 9C:
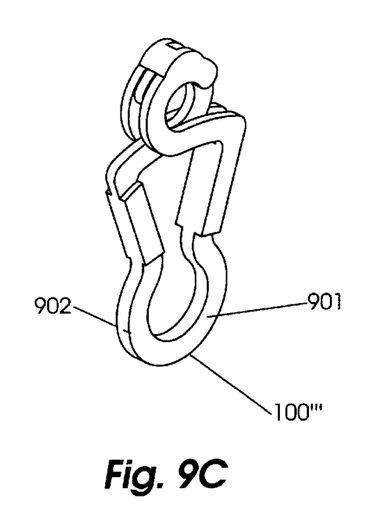
FIG. 9C is a perspective view of another alternative embodiment of the fastener having a narrower spring element.

FIG. 9C shows a fastener having a more narrow spring element. Although inner radial surface 101 and outer radial surface 102 are positioned substantially the same as the preferred embodiment, front face 901 and back face 902 of loop 100''' have been positioned closer to the midplane. This results in a reduction of the cross-sectional area of loop 100''' as compared to that of loop 100 in the preferred embodiment. In similar manner to the embodiment of FIG. 9A, this geometry serves to reduce resistive spring force in the engaged- and compressed-states and would be employed for similar reasons.

Figure 9D:
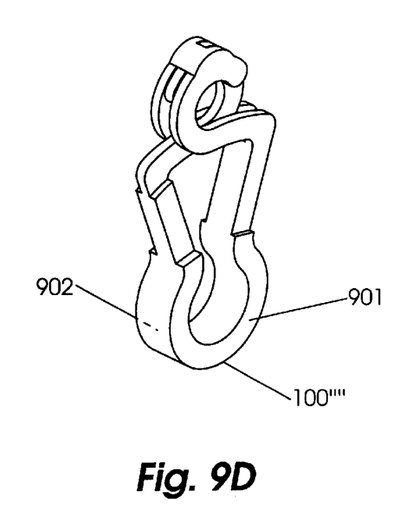
FIG. 9D is a perspective view of another alternative embodiment of the fastener having a wider spring element.

FIG. 9D shows a fastener having a wider spring element. As with the embodiment in FIG. 9C, radial surfaces 101 and 102 are substantially positioned the same as the preferred embodiment; however, faces 901 and 902 have been positioned further away from the midplane. Such geometry increases the cross-sectional area of loop 100'''' and therefore stiffens the spring action of the fastener.

Conclusions, Ramifications, and Scope

Accordingly, it can be seen that, according to the invention, a detachable clasping fastener is provided which can reversibly link two objects, yet can be produced in an economical, rapid, reliable, and aesthetic manner. As stated, it can be produced from a variety of materials including thermoplastics, thermosets, and metals via various forming technologies. Furthermore, additional features and geometries can be added to the fastener to allow for increased fastening security, attachment of odd-sized objects, and use of stiff or soft forming materials. Although the primary application of the invention may be to attach keys to keyrings, other applications exist including fastening identification tags to luggage, and other situations where two or more objects required reversible attachment.

While the description above contains many specificities, these should not be construed as limiting the scope of the invention but as merely providing illustrations of some of the presently preferred embodiments of this invention. Various other embodiments and ramifications are possible within it's scope. For example, while the various embodiments are depicted as having a generally rectangular cross-sectional shape, it may also be suitable to utilize other cross-sectional shapes such as circular, semi-circular, or ellipsoidal. Other embodiments can contain additional features such as ridges, grooves, or bumps for enhanced finger grip.

Thus the scope of the invention should be determined by the appended claims and their legal equivalents, rather than by the examples given.

I claim:

1. A detachable clasping fastener, comprising:
   a pair of opposed hook members for engagement with a secondary object,
   said hook members being connected with a spring loop member via a plurality of connecting members,
   one of said hook members containing a slot,
   the distal end of said slot comprising a bridge member,
   the other of said hook members having a protrusion,
   whereby said bridge member and said protrusion are brought into contact and engaged when said hook members are squeezed together, thereby preventing said hook members from returning to an unengaged configuration, and
   whereby additional squeezing induces said hook members to spread away from each other thereby forming an opening to permit attachment with or detachment from said secondary object.

2. The fastener of claim 1 wherein said fastener is a single object which is fabricated via plastic injection molding.

3. The fastener of claim 1 wherein said fastener is a single object which is fabricated via metal particle injection molding.

4. The fastener of claim 1 wherein one of said hook members has a substantially planar face, said planar face being generally perpendicular a corresponding face of the other hook member, and said connecting member of said other hook member having a plurality of protruding members, such that said protruding members engage said substantially planar face to provide resistance to unwanted opening.

5. The fastener of claim 1 wherein one of said hook members has a plurality of protruding features extending toward the mid plane of said slot from the interior surface of each half of said hook member, and said connecting member of the other hook member having invaginated catch features on its front and back surfaces, such that said protruding features nest into and engage said catch features to provide resistance to unwanted opening.

6. The fastener of claim 1 wherein a closed secondary loop member is attached to the outside surface of said spring loop member, such that a site for permanent affixation is provided.

7. The fastener of claim 1 wherein said spring loop member can be fabricated thicker or thinner, wider or narrower, as required to provide proper spring force and resistance to breakage.

8. A reversibly engageable clasp, comprising:
   two generally symmetric halves,
   each of said halves having a plurality of opposed open loop members,
   one of said halves being formed of a single, integral member,
   said one half having a barb feature on its open loop member,
   the open loop member of the other of said halves having dual arms,
   said dual arms being connected by a spanning member on said open loop members,
   whereby said barb member is brought toward, pushed beneath, and engaged upon said spanning member when said opposed open loop members are forced together, thereby preventing said open loop members from returning to their initial configuration, and
   whereby subsequent application of force induces said open loop members to separate from each other until a gap is formed which allows fixation to or defixation from another object.

9. The clasp of claim 8 wherein said clasp is a single part which is produced by plastic injection molding.

10. The clasp of claim 8 wherein said clasp is a single part which is produced by metal casting.

11. The clasp of claim 8 wherein said open loop members of said other half have extending faces, said faces being generally perpendicular to the open loop member of said one half, and said spanning member of said one half having protruding members, such that said protruding members engage said extending faces to provide resistance to unwanted opening.

12. The clasp of claim 8 wherein said open loop members of said other half have protrusive features extending from the inner faces toward the midplane of the clasp, and said spanning member of said one half having depressions on its front and back surfaces, such that said protrusive features nest into and engage said depressions to suppress unwanted opening.

13. The clasp of claim 8 wherein a ring member is situated on the outer surface where said two generally symmetric halves meet, such that objects may be affixed to said clasp through said ring member.

14. The clasp of claim 8 wherein the region where said two generally symmetric halves meet provides spring action, said region having a predetermined cross-sectional geometry to provide a predetermined spring force.

15. A single-piece disengageable fastener, comprising:
   a generally semi-circular spring member having two ends,
   a first curved fixation member connected to one end of said generally semi-circular spring member by a radial member and a lateral member,
   said first curved fixation member having a protruding catch member,
   a second curved fixation member connected to the other end of said generally semi-circular spring member by a second radial member and a second lateral member,
   said second curved fixation, radial, and lateral members being generally symmetric and opposed to said first curved fixation, radial, and lateral members,
   said second curved fixation member being separated into two substantially equivalent halves by a channel, said channel extending through said secondary lateral member,
   said channel being spanned by a bridging member connecting said substantially equivalent halves of said second curved fixation member,
   whereby said bridging member and said catch are brought into contact and engaged when said first and second axial members are pushed together, thereby preventing said first and second fixation members from returning to an original state, and whereby application of additional pressure induces said curved fixation members to move away from each other, thereby forming a cleft to permit attachment with or detachment from a secondary object.

16. The fastener of claim 15 wherein said fastener is produced via plastic blow molding to form a unitary object.

17. The fastener of claim 15 wherein said fastener is produced via powder metallurgy to form a unitary object.

18. The fastener of claim 15 wherein contact surfaces of said radial members have gripping features to promote traction between said contact surfaces and the user's fingers.

19. The fastener of claim 18 wherein said gripping features are selected from a class consisting of bumps, dimples, grooves, ridges, and knurls.

20. The fastener of claim 15 further including a headed stud positioned on the outer surface of said semi-circular spring member, said stud engaged in an eyelet of a secondary ring structure, said eyelet captured by a head element of the stud, such that said fastener is securely attached to said secondary ring and is allowed to swivel.

21. The fastener of claim 15 further including a split or gated ring member situated on the outer surface of said semi-circular spring member, such that objects may be reversibly affixed to said fastener through said ring member.

22. The fastener of claim 15 wherein at least one surface of said radial or lateral members is suited for application of printed or embossed information.

* * * * *